United States Patent Office 3,169,834
Patented Feb. 16, 1965

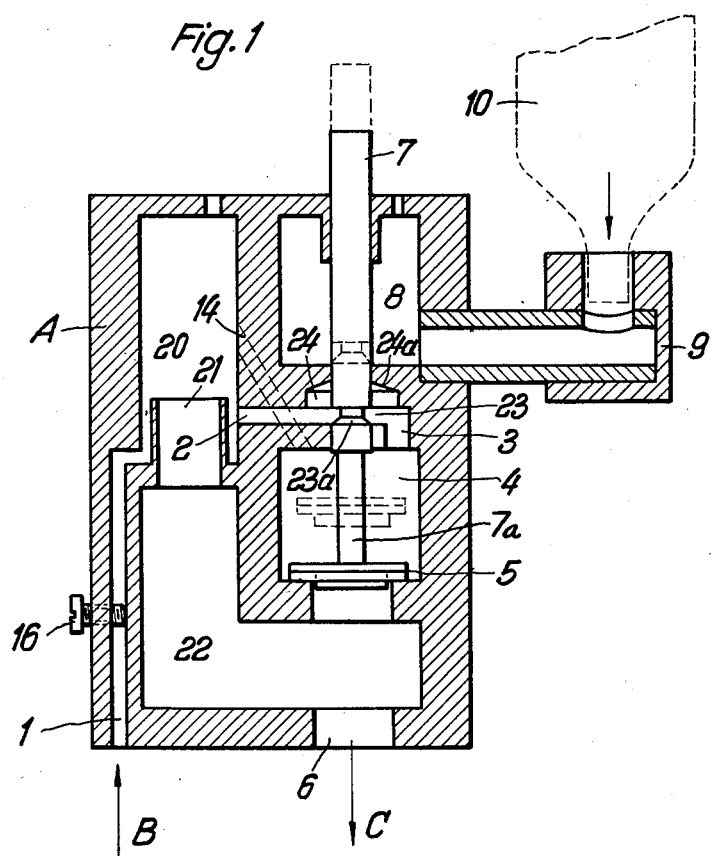

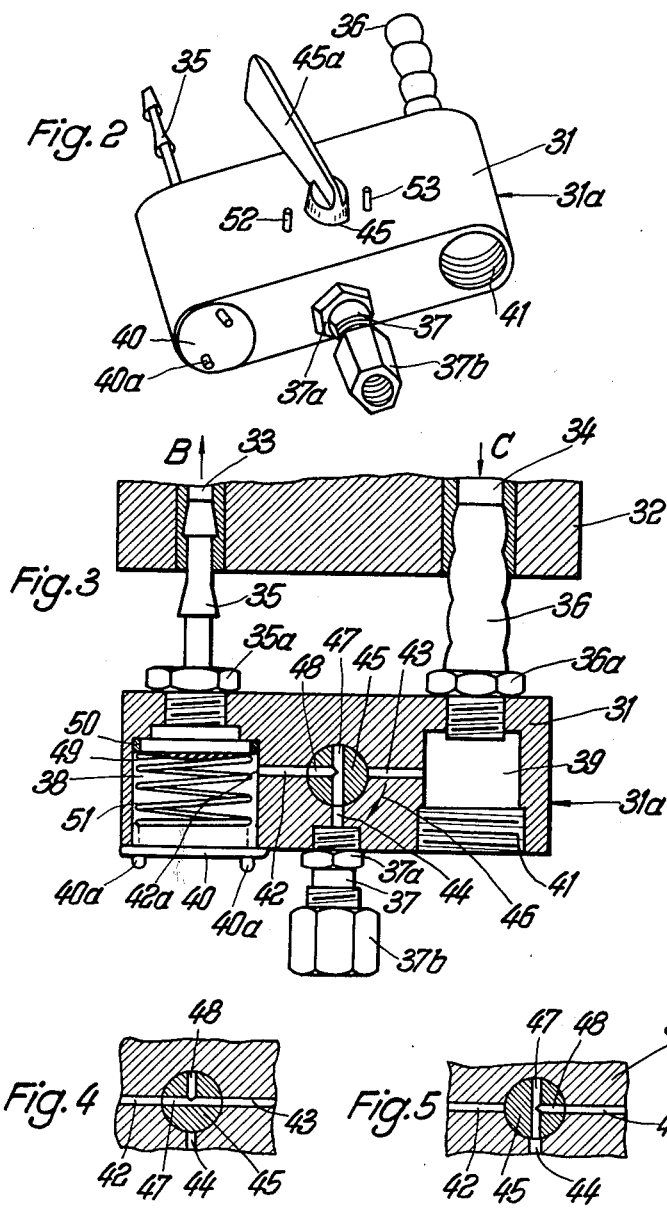

3,169,834
INSTRUMENT FOR TESTING A LIQUID
Günther Otto and Hans-Joachim Heyl, both of Hildesheim, Germany, assignors to Gebruder Heyl, Chemische Fabrik KG., Hildesheim, Germany, a limited partnership of Germany
Filed Apr. 4, 1962, Ser. No. 185,042
Claims priority, application Germany, Apr. 6, 1961, H 42,217; Jan. 9, 1962, H 44,563
14 Claims. (Cl. 23—253)

The present invention relates to an instrument for periodically testing a liquid by admixing a liquid indicator agent thereto and by observing any change of color caused thereby. More particularly, the present invention is applicable to a system for automatically and continually monitoring the quality of water, a change of color occurring upon admixture of the indicator agent indicating that the concentration in the water of certain constituents exceeds a predetermined limit, said constituents including, for instance, the hydrogen ions (pH-value and $m$-value), the remaining oxygen, the remaining hardening minerals, silica, hydrazine and phosphate.

Suitable indicator agents for determining the remainder of hardening minerals in de-mineralized water by means of a readily perceivable change of color have become known and available in commerce in recent years. Other suitable indicator agents are available for determining the concentration of hydrogen ions and the other constituents referred to hereinabove.

It is the object of the present invention to provide an instrument whereby a metered quantity of one or more indicator agents can be automatically and periodically admixed to a predetermined quantity of the liquid to be tested, said predetermined quantity of liquid being included in a measuring chamber having a transparent white or suitably colored wall permitting inspection of the mixture and observation of any change of color thereof.

It is another object of the present invention to provide an instrument for the purpose described hereinabove which is of simple and rugged design and is reliable in operation and requires a minimum of service.

Further objects of the present invention will appear from a detailed description of a preferred embodiment thereof following hereinafter with reference to the accompanying drawings. It is to be understood, however, that the present invention is in no way restricted or limited to such details but is capable of numerous modifications within the scope of the appended claims and that the terms and phrases used in the description following hereinafter have been chosen for the purpose of explaining rather than that of restricting or limiting the invention.

With the afore-said objects in view the invention consists in the novel combinations and arrangements of parts hereinafter described and illustrated in the annexed drawing wherein like parts are designated by the same reference characters throughout the several views.

In the drawings

FIG. 1 is a vertical section taken through the main housing of the novel testing instrument, FIG. 2 is a perspective view of an auxiliary housing and of pipes for connecting it with the main housing shown in FIG. 1, FIG. 3 represents a vertical section through the bottom of the main housing and through the auxiliary housing connected thereto by pipes, and FIGS. 4 and 5 illustrate a part of FIG. 3 showing various positions of a plug valve illustrated therein.

As shown in FIG. 1 the novel testing instrument includes a main housing A provided with an entrance duct 1, with a discharge duct C, with a measuring chamber 4 having an inlet 3 at its top and an outlet in its bottom, with a passageway 2 establishing a communication between the entrance duct 1 and the inlet 3 and with an overflow duct 22 establishing a communication between the discharge duct C, the passageway 2 and the outlet of chamber 4.

The medium to be tested enters the entrance duct 1 as indicated by the arrow B and flows into a compartment 20 which is provided in the upper portion of the housing and forms a widened section of passageway 2. The flow of liquid can be controlled by an adjustable throttle formed in the present embodiment by a set screw 16 which extends into the entrance duct 1 and is adjustable from the outside. A discharge tube 21 is so inserted in the housing as to extend from below into the passageway 2, 20, said discharge tube 21 having a substantially horizontal over-flow edge within the passageway located at a level higher than that of the inlet 3. This discharge tube serves the purpose of diverting the flow of liquid from the measuring chamber 4 after the flow has filled the latter. For this purpose the discharge tube 21 communicates with the over-flow duct 22.

The liquid entering the passageway 2 flows through the inlet 3 into the measuring chamber 4. Valve means are provided for temporarily closing the outlet provided in the bottom of chamber 4 thus causing the flow to fill the chamber. Moreover, means are provided for supplying a metered quantity of an indicator agent to the chamber 4 for admixture to the liquid therein. At least a portion of the housing forming a wall of chamber 4 is transparent for inspection of the mixture of the liquid to be tested and for observation of any change of color of the mixture.

A supply chamber 8 is formed in the housing A so as to be spaced from and located above the measuring chamber 4. The horizontal narrow section of the passageway 2 extending to the inlet 3 is located between the chambers 4 and 8. In the embodiment shown the means for supplying a metered quantity of the indicator agent to the chamber 4 comprises feeding means which connect the two chambers and are preferably formed by an upright cylindrical stem 7, 7a which is slidably guided for lengthwise movement in the housing and extends from the supply chamber 8 downwardly through the passageway 2 and into the measuring chamber 4. This stem is formed with an annular groove 23 and on its lower end with a valve body 5 for cooperation with the outlet opening provided in the bottom of chamber 4 and communicating with the overflow duct 22. The annular groove 23 is spaced from the bottom of the valve body 5 substantially the same distance as the distance of the bottom of the measuring chamber 4 from the portion of the passageway 2 intersected by the stem 8. As a result, the groove 23 will be located within the supply chamber 8, when the stem 7 is in its upper position, as indicated by dotted lines. In this position the groove will receive a metered quantity of a liquid indicator agent in chamber 8. The lower portion 7a of the stem located within the measuring chamber 4 has a reduced diameter smaller than that of the upper portion of the stem. When the stem is in its upper position, the reduced portion 7a thereof extends into the passageway 2 to thereby establish a flow-way extending from the passageway 2 into the measuring chamber 4 and surrounding the stem portion 7a. This flow-way is provided in addition to the inlet 3 for admitting the flow from the passageway 2 into the measuring chamber in a central location thereof above the valve body 5. This valve body will distribute the liquid evenly whereby the chamber 4 will be effectively rinsed by the flow of liquid therethrough.

When the stem is moved to its lower position, the valve body 5 closes the outlet of chamber 4 and the groove 23 is aligned with and communicates with the passageway 2 to cause the flow of liquid to be tested to scavenge the groove and to carry the indicator agent therefrom towards the inlet 3 and into the measuring chamber 4. When the latter has been filled, the flow through the narrow section of passageway 2 will stop and all of the flow through the entrance duct 1 will pass over the overflow edge of the discharge tube 21 and through the overflow duct 22 and will be discharged from the housing through the discharge duct C.

Suitable means are provided to keep the level of the liquid indicator agent in chamber 8 constant, such means comprising suitable means, such as a horizontal tube inserted in the wall of housing A and communicating with chamber 8 near the bottom thereof and a bracket 9 rotatably mounted on the pipe, for pivotally mounting a bottle indicated by dotted lines in FIG. 1. The mouth of the bottle is inserted in a radial bore of the bracket 9. When the bottle is moved to inverted upright position as shown this radial bore communicates with a hole provided in the wall of the pipe. In this manner communication is established between the bottle and the chamber 8. When the bottle leaves its inverted upright position, however, the radial bore of bracket 9 will be moved out of registry with the hole in the pipe to thereby interrupt the communication of the bottle with the chamber 8. Hence, it will appear that the means for pivotally mounting the bottle 10 constitutes a valve for interrupting the communication of the bottle with the supply chamber 8 when the bottle leaves its inverted upright position. Each of the two chambers 4 and 8 is provided with a vent at its top establishing a communication of the chamber with the atmosphere. The vent 14 of chamber 4 leads into the chamber 20 and the latter is provided with a vent at its top shown in FIG. 1. Hence, when the flow of the liquid to be tested fills up chamber 4 after valve 5 has been closed, the air may escape from the chamber 4. Similarly, when the liquid indicator agent enters chamber 8 from the bottle 10, the air may escape therefrom.

When the bracket 9 is turned with its radial bore directed downwardly, the bottle 10 may be readily exchanged for a new bottle without risking any escape or loss of liquid indicator agent from chamber 8.

The stem 7 extends through the top of chamber 8 out of the housing A for the purpose of manual or automatic actuation whereby it will be periodically moved from its upper position shown in broken lines to the lower position shown in full lines being left in the lower position for the period required for the liquid to be tested to fill up chamber 4 and for observation of any change of color. The duration of the measuring periods and the intervals between the measuring periods are so chosen as to meet the specific requirements of any particular case. The mechanism for automatic actuation of the stem 7 has not been shown, as such time-controlled cam mechanisms driven by an electric motor are well known in the art.

If desired, a suitable source of light, preferably colored light, may be provided to facilitate the observation of the liquid in the measuring chamber 4 through a suitable window thereof. After the observation has been completed, the stem 7 will be raised again permitting the mixture of the liquid to be tested with the indicator agent to be discharged through the outlet of chamber 4 and the discharge duct C, the chamber 4 being subsequently rinsed in the manner described hereinabove.

A third chamber 24 may be provided in the housing between the measuring chamber 4 and the supply chamber 8. This third chamber is intersected by the narrow section of passageway 2 and the stem 7 extends centrally through the third chamber 24. The top surface 24a of the third chamber is preferably conical so as to slant outwardly and downwardly from the stem 7. As a result, the liquid will completely leave the groove 23 on upward movement of the stem 7. By means described hereinafter, the flow B of liquid will be shut off occasionally and, on such occasions, the entrance duct 1 will be connected with the discharge duct C for the purpose of emptying the passageway 1 and for filling chamber 24 with air. This air will permit the liquid to flow out of the annular groove 23, when the stem is raised. For the same purpose, the lower wall 23a of the groove 23 is preferably conical so as to slant outwardly and downwardly as shown in FIG. 1.

From the above it will appear that the stem 7 constitutes a member slidably guided in an aperture provided in the portion of the housing which separates the supply chamber 8 from the passageway 2 and that this slidable member serves to feed a metered quantity of the indicator agent to the flow of liquid passing the passageway 2.

Moreover, it will appear from the above that this slidable member and the valve means 5 are connected for common movement of said member from normal position shown in dotted lines to the operated position shown in full lines and of said valve from the open position shown in dotted lines to the closed position shown in full lines and vice versa.

Owing to the complete removal of the liquid from the annular groove 23 on upward movement of the stem 7, no such liquid will be carried upwardly into the chamber 8. This is important because otherwise the indicator agent in chamber 8 would get diluted.

Preferably, means are provided which permit the entrance duct 1, the passageway 2, the chamber 4 and the overflow duct 22 to be completely emptied by interrupting the flow B and by connecting the entrance duct 1 to the dicharge duct C.

For this purpose, there are provided manually operable valve means illustrated in FIGS. 2–5 which are optionally movable to any one of three positions and are operative in the first one of said positions to connect a supply duct for supplying the liquid to be tested with the entrance duct 1 for a testing operation and, in the second one of said positions, to close said supply duct and to connect the entrance duct 1 to the discharge duct C for removal of any tested liquid from the housing and, in the third one of said positions, to connect said supply duct directly to the discharge duct for discharge of the flow of liquid during the intervals between testing operations.

In the embodiment illustrated in the drawings these manually operable valve means are mounted in an auxiliary valve housing 31 provided with conduits 38 and 39 and with a port 44 communicating with a supply duct 37. A first pipe 35 connects the conduit 38 with the entrance duct 1 of the main housing A with the aid of a suitable nipple 33, whereas a second pipe 36 connects the other conduit 39 with the discharge duct C by means of a suitable nipple 34. The nipples 33 and 34 are suitably inserted in the bottom wall 32 of the main housing A.

The auxiliary housing 31 is connected with the pipes 35 and 36 and with the supply duct 37 by suitable nuts 35a, 36a and 37a, respectively.

The cylindrical conduit 38 is closed at its end opposite to pipe 35 by a threaded cover 40, whereas the conduit 39 is open at its end opposite to pipe 36, such end being provided with internal threads 41 for connection thereto of a discharge pipe. The conduits 38 and 39 and the supply duct 37 communicate with cylindrical bores 42, 43 and 44, respectively, leading to a rotatable valve plug 45 inserted in housing 31. The plug 45 forms part of a plug valve operable by means of a handle 45a fixed to the outer end of plug 45 and rotatable from the position shown in FIG. 3 in the direction of the arrow 46 to a position shown in FIG. 4 and from there to a position shown in FIG. 5. The movement of the plug 45 is limited by abutments 52 and 53 mounted on the outside of housing 31. These abutments cooperate with the handle 45a (FIG. 2).

The plug member 45 is provided with a diametrical bore 47 and with a radial bore 48 extending from the diametrical bore at right angles thereto to the periphery of the plug. The bore 47 is adapted to establish communication between the bores 42 and 43 of the housing 31 when the plug is in the position shown in FIG. 4. In the position shown in FIG. 3 the bores 42 and 44 are interconnected by the bores 47 and 48 whereas the bore 43 is sealed. With the plug valve in the position shown in FIG. 5 the bore 42 is sealed whereas the bores 43 and 44 are interconnected by the bores of the plug valve.

A screen 49 is mounted in the conduit 38 at a level located above the port 42a of the bore 42, such screen engaging an internal shoulder 50 of the conduit and being held in engagement therewith by a helical pressure spring 51 mounted within the conduit 38 and held in position therein by the cover 40 which is provided with handles 40a for the purpose of removal.

When it is desired to empty the main housing A from the tested liquid, the handle 45a is moved to its central position shown in FIG. 4 in which the flow of liquid through the supply duct 37 is stopped, whereas the entrance duct 1 communicates with the discharge duct C and the conduit 39 through the bores 42, 43 and 47.

The plug is moved to the position shown in FIG. 5 during the intervals between the measuring operations. In this position the plug permits the flow of liquid supplied through duct 37 to be directly discharged into the conduit 39 through the bore 43. If desired, this bore may be inclined to an acute angle to the axis of conduit 39 so that the water issuing from the bore 43 will be directed downwardly with reference to FIG. 3 and thus prevented from building up pressure in the conduit 39.

Various measuring operations which can be carried out with the novel instrument explained hereinabove will now be described hereinafter.

For total hardness tests in the claimed instrument, an indicator solution is used, comprising a stabilized solution of Erichrome Black-T together with an indifferent yellow dye and an alkaline buffer in such amounts that an exactly metered amount of this said indicator solution added to the water sample which is drawn into the testing chamber of the claimed instrument, will impart to said water sample a vivid color and at the same time a pH-value of 9–10, which is optimal for this type of test. The indicator solution not contain an indifferent yellow dye if the transparent section of the wall of chamber 4 is colored yellow.

In this connection the indicator dye is used not only as a color indicator, but at the same time as a titrant as well. Thus, only water with no hardness at all will show a clear green color, whereas water, containing .5 p.p.m. $CaCO_3$ total hardness will show a brownish green, .9 p.p.m. $CaCO_3$ will show a reddish brown and 1.3 p.p.m. $CaCO_3$ and above will show a red color in the window of the claimed instrument. These color differentiations can be used for visual or photoelectric evaluation of the degree of residual total hardness within the limit of zero and 1.3 p.p.m. $CaCO_3$.

Since the residual hardness of technical softened waters usually is much higher, an indicator can be used, which contains in addition to the above cited constituents, fixed amounts of a compleometric titrant as e.g. the di-sodium salt of ethylenediaminetetraacetic acid, to bring about the color change from green to red at higher hardness levels, as e.g. 8 p.p.m. $CaCO_3$.

In cases where the monitoring of carbonate, rather than total hardness is required, the claimed instrument can be used without any technical changes by simply substituting an indicator, which is suitable for this purpose. An indicator for carbonate hardness should contain an indicator dye, sensitive to pH with color changes preferably at pH 4–5. In addition to the dye the indicator should contain an acid as titrant to effect the color change at preferential levels of carbonate hardness as e.g. 20 or 40 p.p.m. $CaCO_3$.

*Examples*

(1) .07 ml. of an indicator solution containing Eriochrome Black-T, an alkaline buffer, Methyl Orange as indifferent yellow dye, and a stabilizer to improve the storage characteristics, are drawn into the testing chamber and mixed with 20 ml. of sample water as described above. If the color, as observed through the cover window of the instrument is green, the tested water has zero hardness, if red, the hardness lies above 1.3 p.p.m. $CaCO_3$ and if an intermediate color is observed, the total hardness lies between 0 and 1.3 p.p.m. $CaCO_3$.

(2) .07 ml. of an indicator solution as described in Example 1 but containing in addition .8% of the di-sodium salt of ethylenediaminetetraacetic acid are treated with 20 ml. water sample as described in (1). With this type of indicator, the colors observed through the window of the claimed instrument have the following meaning:

Green=below 7 p.p.m. $CaCO_3$ total hardness
Red=above 8.5 p.p.m. $CaCO_3$ total hardness
Intermediate=between 7 and 8.5 p.p.m. $CaCO_3$.

(3) .07 ml. of an indicator solution, containing .1% Brom Cresol Green, .05% Methyl Red and 9% hydrochloride acid are treated in the same way as described in (1) with 20 ml. water sample. The colors observed through the window of the instrument have the following meaning:

Red=below 30 p.p.m. $CaCO_3$ carbonate hardness
Blue-green=above 40 p.p.m. $CaCO_3$ carbonate hardness
Intermediate color=between 30 and 40 p.p.m. $CaCO_3$ carbonate hardness The advantages of the invention as here outlined are best realized when all of its features and instrumentalities are combined in one and the same structure, but useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

What we claim is:

1. In a testing instrument of the character described the combination comprising a housing, a measuring chamber formed therein having an inlet in its top and an outlet in its bottom, a supply chamber being formed in said housing spaced from and located above said measuring chamber, a said supply chamber accommodating a supply of an indicator agent, a substantially horizontal passageway being located in said housing between said chambers and extending to said inlet for supplying a flow of liquid to be tested to said measuring chamber, and an upright cylindrical stem slidably guided for lengthwise movement in said housing and extending from said supply chamber downwardly through said passageway to the outlet of said measuring chamber and formed with an annular groove and on its lower end with a valve body for cooperation with said outlet, said annular groove being spaced from the bottom of said valve body substantially the same distance as the distance of the outlet of said measuring chamber from the portion of said pasageway intersected by said stem, the latter being movable between an upper position in which said outlet is opened to cause said flow to rinse said measuring chamber and said groove is located within said supply chamber to receive a metered quantity of an indicator agent therefrom and a lower position in which said valve body closes said outlet and said groove communicates with said passageway to cause said flow to carry said quantity into and to fill said measuring chamber.

2. The combination claimed in claim 1 in which the lower wall of said annular groove is conically slanting outwardly and downwardly.

3. The combination claimed in claim 1 in which a third chamber is provided in said housing between said measuring chamber and said supply chamber, said third chamber being intersected by said passageway, said stem extending centrally through said third chamber, the top surface of said third chamber being conical slanting outwardly and downwardly from said stem.

4. The combination claimed in claim 1 in which the lower portion of said stem located within said measuring chamber in said lower position has a reduced diameter smaller than that of the upper portion of said stem, said portions of said stem being so dimensioned that said lower portion, when in said upper position, extends into said passageway to thereby establish a flow-way extending from said passageway into said measuring chamber and surrounding said lower portion of said stem, said flow-way being provided in addition to said inlet for admitting said flow to said measuring chamber in a central location above said valve body and for distribution by the latter for rinsing purposes.

5. The combination claimed in claim 1 further comprising a discharge tube inserted in said housing so as to extend into said passageway from below, said discharge tube having a substantially horizontal overflow edge within said passageway located at a level higher than that of said inlet for the purpose of diverting said flow of liquid from said measuring chamber, after said flow has filled the latter.

6. The combination claimed in claim 1 in which the top of said measuring chamber is provided with a vent establishing a communication thereof with the atmosphere.

7. The combination claimed in claim 1 further comprising a horizontal tube inserted in the wall of said housing and communicating with said supply chamber near the bottom of said chamber, and a bracket rotatably mounted on said tube, said bracket being provided with a radial bore for receiving the mouth of a bottle supplying indicator agent, the top of said supply chamber being provided with a vent whereby said bottle if containing a supply of said indicator agent will keep said supply chamber filled to a predetermined level when assuming an inverted vertical position.

8. The combination claimed in claim 7 further comprising means on said bracket for pivotally mounting said bottle, said means constituting a valve for interrupting the communication of said bottle with said supply chamber when said bottle leaves its inverted upright position.

9. An instrument for testing a liquid by admixing a liquid indicator agent and by observing any change of color caused thereby, comprising a housing provided with an entrance duct, with a discharge duct, with a measuring chamber having an inlet and an outlet, with a passageway provided in said housing and establishing a communication between said entrance duct and said inlet, and with an overflow duct establishing a communication between said discharge duct, said passageway and said outlet, valve means mounted in said housing for opening and closing said outlet, and means mounted in said housing and operable from the outside thereof for supplying a metered quantity of said indicator agent to said inlet, a supply duct for supplying the liquid to be tested, and manually operable valve means optionally movable to any one of three positions and being operative in the first one of said positions to connect said supply duct to said entrance duct for a testing operation and, in the second one of said positions, to close said supply duct and to connect said entrance duct to said discharge duct for removal of any tested liquid from said housing and, in the third one of said positions, to connect said supply duct directly to said discharge duct for discharge of liquid from the supply duct during the intervals between testing operations.

10. The combination as claimed in claim 1 wherein at least a portion of said housing forming a wall of said measuring chamber is transparent for inspection of the mixture of the liquid to be tested with said agent and for observation of any change of color mixture.

11. An instrument as claimed in claim 9 wherein said manually operable valve means is disposed in an auxiliary valve housing, said valve housing being furnished with a port communicating with said supply duct and containing an auxiliary entrance duct and an auxiliary discharge duct controlled by said valve means, and wherein pipes connect said auxiliary ducts of said valve housing with the respective ducts of said instrument housing.

12. An instrument as claimed in claim 11 comprising a screen inserted in said auxiliary entrance duct.

13. The combination as claimed in claim 10 wherein said transparent portion of the wall of the measuring chamber is colored.

14. An instrument as claimed in claim 11 in which said manually operable valve means is formed by a plug valve having its plug mounted between said auxiliary conduits so as to extend at right angles thereto.

References Cited in the file of this patent

UNITED STATES PATENTS

| 10,633 | Cross | Mar. 14, 1854 |
| 2,090,532 | Hobbs | Aug. 17, 1937 |
| 3,080,218 | Gustafson | Mar. 5, 1963 |

FOREIGN PATENTS

| 861,518 | Great Britain | Feb. 22, 1961 |